United States Patent [19]
Stephenson et al.

[11] Patent Number: 5,687,268
[45] Date of Patent: Nov. 11, 1997

[54] PIVOTABLE OPTICAL SHUTTER FOR BLOCKING EMISSION FROM A LIGHTGUIDE ADAPTER #5

[75] Inventors: Daniel Lee Stephenson, Lilburn; James Patrick Towhey, Doraville, both of Ga.

[73] Assignee: Lucent Technologies Inc., Murray Hill, N.J.

[21] Appl. No.: 563,067

[22] Filed: Nov. 27, 1995

[51] Int. Cl.[6] ............................................. G02B 6/38
[52] U.S. Cl. ........................................................ 385/73
[58] Field of Search .......................... 385/19, 78, 147; 369/103, 97, 111, 218; 354/456, 288, 478, 485

[56] References Cited

U.S. PATENT DOCUMENTS

| | | | |
|---|---|---|---|
| 4,134,654 | 1/1979 | Murakami et al. | 354/475 |
| 4,260,858 | 4/1981 | Beiser | 369/103 |
| 4,297,018 | 10/1981 | Murakami et al. | 354/456 |
| 5,067,783 | 11/1991 | Lampert | 385/60 |
| 5,170,446 | 12/1992 | Sullivan et al. | 385/19 |
| 5,212,752 | 5/1993 | Stephenson et al. | 385/78 |
| 5,274,729 | 12/1993 | King et al. | 385/134 |

*Primary Examiner*—Akm E. Ullah

[57] ABSTRACT

An optical shutter for use with optical fiber connector coupling adapters has a front, transverse face which is sufficient to cover the opening in the adapter. The transverse portion has a pair of pivot arms extending from either side thereof which are adapted, at their distal ends, to be pivotally connected to the coupling adapter, thereby providing a pivotal mounting for the shutter. The transverse face also has a flange extending from one end thereof to permit actuation of the shutter, i.e. opening or closing, by means of the connector to be inserted in the adapter, or after removal of the adapter.

17 Claims, 4 Drawing Sheets

5,687,268

PIVOTABLE OPTICAL SHUTTER FOR BLOCKING EMISSION FROM A LIGHTGUIDE ADAPTER #5

FIELD OF INVENTION

This invention relates to lightguide adapters for use the transmission of fibers and, more particularly, to a safety shutter for use with such adapters for blocking light energy within the connection.

BACKGROUND OF THE INVENTION

Optical fiber transmission systems are becoming widely used in the transmission of signals such as data, voice and the like and, in many instances, are replacing traditional electrical systems. Many of the arrangements common to electrical systems, such as coupling, interconnection, splicing, and the like have their counterparts in optical systems but, because of the totally different characteristics of the transmission media, i.e., optical fiber versus metallic wire, connectorization, splicing, and the like involve quite a different apparatus. Where, for example, it is necessary to make a great number of connections in one location, both systems may use what is referred to in the art as patch panels, which provide arrays of connector adapters for interconnection, but the interconnections themselves are generally quite different.

It is common practice in the optical connector art to terminate a length of optical fiber with a connector, an example of which is the SC type connector that is shown and described in U.S. Pat. No. 5,212,752 of Stephenson et al. There are numerous types of such fiber terminating connectors, and, inasmuch as there has been little effort directed to standardization, each type of connector generally requires a different coupling arrangement to permit interconnection of two fibers, for example. The SC connector is becoming more and more popular, and the remainder of the discussion, in the interest of simplicity, is devoted to such a connector. It is to be understood that the following description of the principles and apparatus of the invention is applicable to other types of connectors as well. As is shown in the Stephenson et al. patent, an SC connector includes a ferrule assembly including a barrel having a collar at one end and an optical fiber terminating ferrule projecting from the barrel. The ferrule assembly is disposed in a plug frame such that an end portion of the ferrule projects from one end of the frame. The plug frame is configured to snap lock into a grip member having a locating key thereon, and the grip is inserted into one side of a slotted coupler adapter, with the locating key inserted into the slot. The grip of a corresponding SC connector is inserted into the other side of the adapter so that the ends of the ferrules abut each other to form a low insertion loss optical interconnection. In the SC connector, the ferrules are spring loaded longitudinally to insure contact between the fiber containing ferrule ends. The entire interconnect operation involves linear motion only and results in a low insertion loss, mechanically stable, protected junction between two fibers. The expenditure of time in making the interconnection is small and the operator or installer is relieved of having to perform anything other than simple linear motion in plugging the connectors into the coupling adapter.

When large numbers of such interconnections are to be made, it is common practice to use patch panels for holding an array of a large number of coupler adapters. Thus, there can literally be hundreds of such adapters, all in close proximity to each other, mounted in the panel. As long as only a single type of connector, such as the SC connector, is involved, simple adapters may be used for plugging in the connectors from each side of the patch panel. In view of the fact that there are several different types of connectors in widespread use today, it has become common practice to replace the simple adapters with buildout blocks or buildout coupling adapters. In U.S. Pat. No. 5,274,729 of King et al., there is shown a buildout coupling adapter system in a patch panel that makes possible interconnections among the several different types of connectors in any combination thereof. As can be seen in that patent, a buildout block at one side (or end) thereof is configured the same as a simple coupler adapter having a keyway for receiving, for example, an SC connector. The other end of the buildout block is formed to receive a buildout which may be configured to receive and hold, for example, an SC, an ST, or an FC connector. Thus, the patch panel may be, on one side thereof, pre-connectorized with optical fibers all of which are terminated by SC connectors, and the other side of the panel is ready to receive pre-connectorized fibers terminated by any one of the numerous connectors. Such an arrangement is more versatile and adaptable than those arrangements which are limited to a single type of pre-connectorized fiber. Such an arrangement also functions well in those installations where one side of the panel is not readily accessible. Thus, the panel can be pre-connectorized before mounting in position on the side which will be relatively in-accessible, after which it can be mounted in place, ready to receive the numerous connections thereto, regardless of connector type.

In any such arrangement, there is an inherent safety hazard that is often present. Where one or more of the pre-connectorized fibers is carrying optical energy, such energy can be emitted from the end of the fiber connector and pass through the buildout block or coupling adapter to the side of the panel where connections are to be made. This optical energy can be harmful for the operator or installer and can be especially harmful to his or her eyes. This hazard is most prevalent when an active connection has to be repaired or otherwise altered by removing an existing connectorized fiber and replacing it with another. In such an instance, it might be difficult or otherwise impractical to shut off the signal transmission in that particular fiber circuit, hence, the installer is forced to deal with a light emitting junction or connection.

This hazard has been recognized and there have been efforts made, in the prior art, to provide a shutter for the opening in the buildout block or adapter to block any light emanating from a fiber connection through the open adapter. One such arrangement comprises a door like member pivotally mounted to the end of the adapter, with a biasing spring adapted to maintain the door in its closed position, blocking the open end of the adapter. When a connection is to be made, the installer, for example, presses on a projecting ledge at the end of the door to pivot the door up against the spring bias. The door has to be held open while the connector is inserted into the adapter. Thus, the installer is forced to use both hands in making a connection. In most patch panels, the adapter or buildouts are arrayed quite close together, thereby making it awkward or difficult for the installer to open the shutter or door and hold it open without interfering with other connections. In addition, there is a moment, when the door is pivoted open, when light energy is not blocked and thus emerges from the adapter. Prior art arrangements of the spring loaded type are not, therefore, completely successful in that they require the use of two hands, and do not completely block the light during connectorization.

3

What is needed, therefore, is a shutter arrangement for an adapter or buildout that can be actuated with one hand and which substantially completely blocks the light even during the connectorization process.

SUMMARY OF THE INVENTION

The problems and disadvantages of the prior art, as discussed in the forgoing, are overcome by the present invention, which comprises a shutter assembly for use with an adapter or buildout adapter. In a first preferred embodiment of the invention, a buildout member for receiving an SC type connector comprises a tubular housing which is latched to a buildout block. The buildout member is preferably made of a thermoplastic material, such as polysulfone which, in the finished product, is a strong, substantially rigid, material. The basic structure of the buildout is shown in the aforementioned U.S. Pat. No. 5,274,729 of King et al., however, the buildout of the invention differs therefrom in that first and second pivot pins, which are preferably centrally located between top and bottom walls of the tube and extend outwardly from opposite sides of the tubular housing. The shutter member of the invention has a light blocking transverse section has pivot arms extending from either side and oriented substantially normal to the transverse section. The shutter is preferably made of a thermoplastic material, such as PBT, which has, in the finished state, a degree of resilience. The distal ends of each of the pivot arms has a pivot hole therein for receiving the corresponding pivot pin on the side of the tubular housing, in a loose fit. Thus, when the distal ends of the pivot arms are snapped over the pivot pins, the shutter member is freely pivotable relative to the tubular housing while remaining attached thereto. The orientation of the shutter member relative to the tubular housing is such that the shutter member pivots up and down relative thereto when mounted to the buildout block. The from face of the transverse section has, along the bottom edge thereof, a forwardly extending flange which spans the width of the transverse section.

In operation, when the buildout block, the buildout, and the shutter member are in place, as on a patch panel, for example, the normal position of the transverse light blocking section is down, thus preventing any light signals from emerging. When the installer makes a connection of an SC connector, for example, to the buildout assembly, he pivots the shutter up by causing the tip of the connector in his hand to bear against the underside of the transversely extending flange and, as the shutter pivots upward, slides the connector into the buildout assembly and seats it. Thus, practically no light is allowed to pass out of the buildout assembly, and the entire connection operation is performed by the operator using only one hand. The adapters or buildouts can be located quite close to each other without in any way interfering with the operation, whereas such crowding does interfere with the two-handed operation of the prior art.

When a disconnect is to be performed, almost the exact reverse of the connection sequence occurs, with the shutter dropping down by gravity to block any light as the connector is removed from the adapter or buildout. In the preferred embodiment, the interior spacing between the two pivot legs is substantially equal to the exterior width of the buildout tubular sleeve to the degree that friction tends to hold the shutter in the closed position. Because of this, the shutter is equally effective in those installations where it has to pivot sideways because of the orientation of the buildout, with the added difference that the tip of the connector is used both to open and to close the shutter.

The shutter arrangement of the invention is readily adaptable for use with other types of buildouts and connectors as well as the SC connector, as well as simple coupler adapters. In addition, it functions to block light regardless of its orientation, i.e., vertical or horizontal, without springs, and without the necessity of the installer using two hands to accomplish a coupling.

The shutter of the invention also functions as a dust cover for protecting the interior of the adapter when not in use. Usually, such dust covers are detachable and easily lost, whereas the dust cover/shutter of the invention is attached to the adapter and usable on a continuing basis.

The principals and features of the present invention will be more readily apparent from the following detailed description, read in conjunction with the accompanying drawings.

DETAILED DESCRIPTION

Figure 1A:
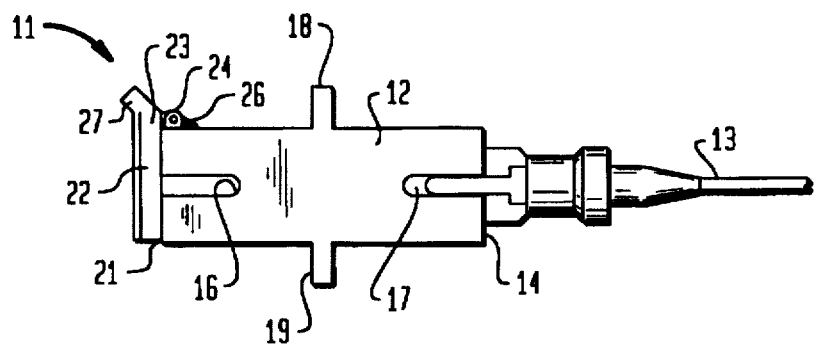
FIG. 1A is a side elevation view of a prior art shutter arrangement in the closed position as used on a simple coupler adapter.
Figure 1B:
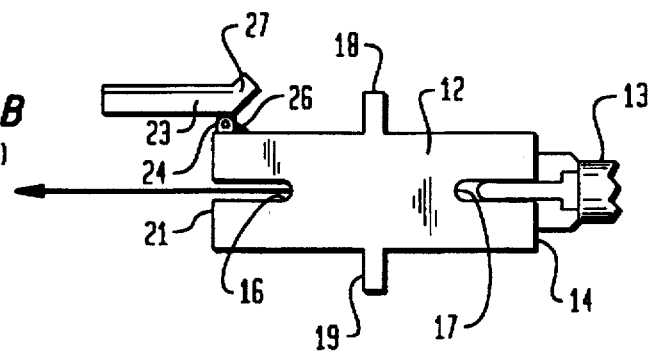
FIG. 1B is a side elevation view of the prior art shutter arrangement in the open position as used on a simple coupler adapter.

In FIGS. 1A and 1B there is shown a prior art shutter arrangement 11 as used on a standard coupler adapter 12. For a better understanding of the location of the elements involved, an SC connectorized fiber 13 is shown connected to adapter 12 at one end 14 thereof. Adapter 12 has locating key slots 16 and 17, and mounting flanges 18 and 19 for mounting to a patch panel, for example. Flanges 18 and 19 serve to locate adapter 12 longitudinally with respect to the panel, not shown. At the other end 21 of the adapter 12 is mounted a shutter member 22 which is pivoted at its top end 23 to pivot brackets 24 on adapter 12. A spring 26 biases shutter member 22 into its closed position, as shown in FIG. 1A. The top end 23 of shutter 22 has a flange portion 27 projecting at an angle to member 22, as shown. Projection 27 enables an operator or installer to open shutter 22 to the position shown in FIG. 1B by pressing on the underside thereof with his finger, for example. When the shutter is positioned as shown in FIG. 1B, a connector may be inserted into end 21 of adapter 12. When the connector is removed, the spring 26 snaps the shutter member 22 down into the position shown in FIG. 1A. It should be understood that the adapter 12 may be oriented at right angles to its longitudinal axis in which case the shutter member 22 opens to the side instead of toward the top. Hence, the terms "up", "down", and "top" are intended to apply to the orientation shown in FIGS. 1A and 1B, and are not intended to be exclusive as to the orientation of adapter 12.

The prior art arrangement shown in FIGS. 1A and 1B is adequate in its function of blocking light energy emanating from fiber 13 and passing through adapter 12, as indicated by the arrow. However, it requires the use of two hands, which becomes especially awkward where there are large members of adapters mounted in close proximity to each other on, for example, a patch panel.

Figure 2:
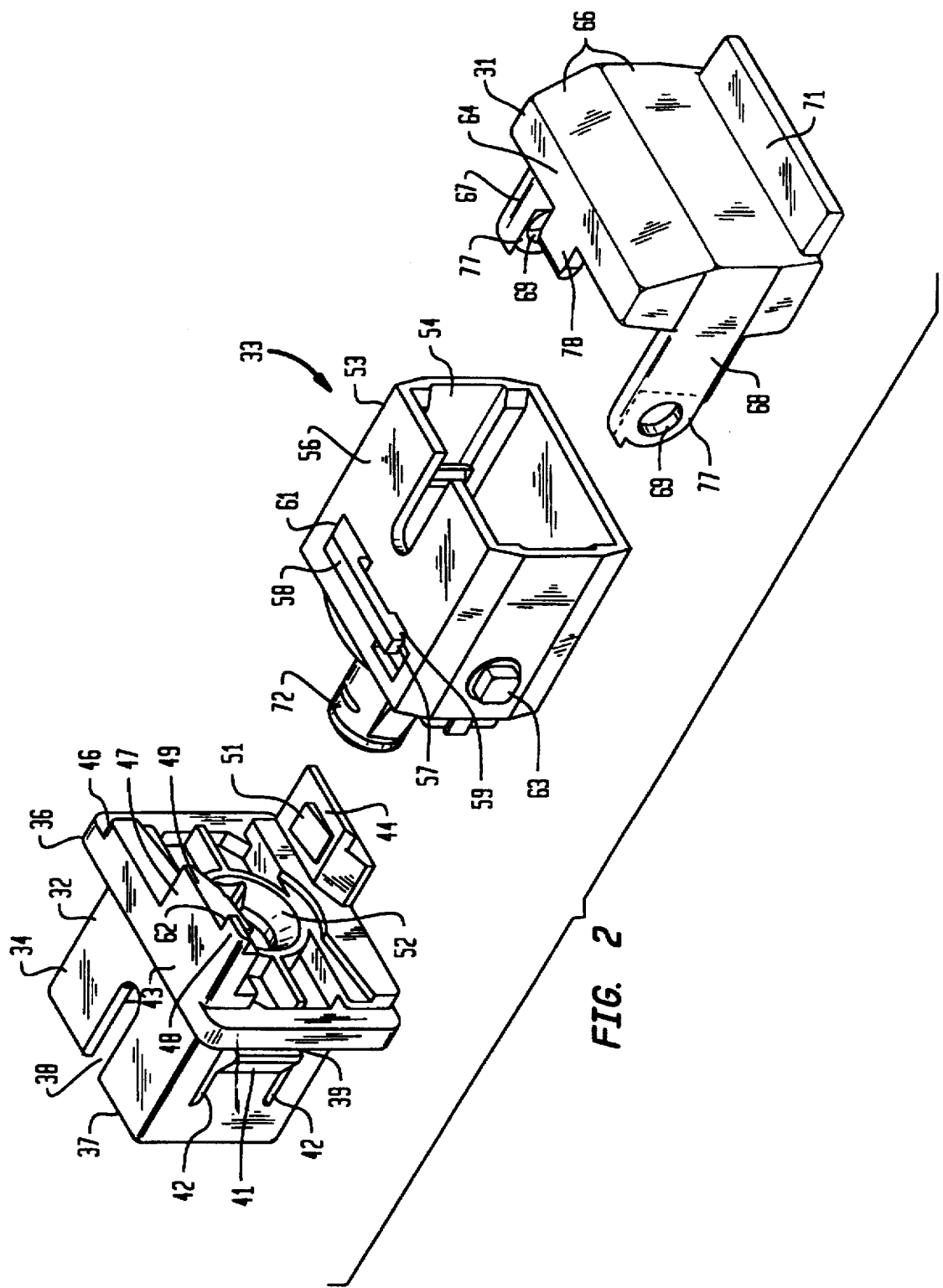
FIG. 2 is an exploded perspective view of the various components of a coupler buildout utilizing the present invention.

FIG. 2 depicts the shutter 31 of the present invention and its relationship to the buildout block 32 and buildout 33 for use with SC connectors. It is to be understood, as pointed out hereinbefore, that the shutter 31 of the invention is readily adaptable for use with other types of buildouts for different types of connectors as well as being adaptable for use with the standard coupler adapter.

Buildout block 32, which is shown and described in detail in the King et al. patent, comprises a housing 34 which preferably is made of a suitable plastic material and which has a flange 36 for engaging the front face of a patch panel, not shown. Extending from the flange 36 rearwardly is a tubular portion 37 which has a substantially rectangular cross section and which includes a keyway slot 38 opening to the rear of tubular portion 37. On either side of the tubular portion 37 are openings 39, only one of which is shown within each of which is disposed a depressible latching finger 41, spaced from the sides of opening 39 by slots 42, and which extends out of the plane of the side of tubular member 37. The buildout block is insertable into an opening in the patch panel from the front, which causes the latching fingers 41 to be depressed. As the distal ends of the fingers move past the rear of the patch panel, they spring outward and bear against the rear face of the panel, thereby locking buildout block 32 in place.

On the front side of flange 36 and extending therefrom are first and second extensions 43 and 44. Extension 43 is stepped, having a first portion 46, a second portion 47 which extends beyond portion 46, and a third portion 48 which extends beyond portion 47. The inner surface of portion 47 has a wedge shaped keeper 49. Extension 44 has a wedge-shaped member 51 on the inner surface thereof. The front face of flange 36 has a bore 52 for receiving the ferrule of the SC connection, the ferrule being mounted in a connector, not shown, as fully explained in the aforementioned King et al. patent. The connector, itself, is mounted in the buildout 33.

The buildout 33 comprises a tubular housing 53 of a suitable strong thermoplastic material, such as polysulfone, although other plastic materials may be used, which has a substantially rectangular cross-section and which is preferably made of a suitable plastic material. Housing 53 has a key slot 54 opening to the front of housing 53, as shown. One surface 56 of housing 53 is a latch 57 which comprises a cantilever arm 58 having a distal end 59 and a proximal end 61. When the adapter carried by buildout 33 is inserted into bore 52, the buildout 33 is rotated slightly about its longitudinal axis prior to insertion. When the buildout 33 is then rotated back to its proper position, latching arm 58 snaps into place where end 59 bears against the step 62 between extensions 47 and 48 on the buildout block 32, thereby locking buildout 33 to buildout block 32. The configurations and operation of buildout block 32 and buildout 33 as thus far discussed are more fully described in the aforementioned King et al. patent, the disclosure of which is incorporated by reference herein. In accordance with the present invention, buildout 33 has a pivot pin 63 projecting from each side thereof, only one such pin being shown in FIG. 2.

The shutter 31 of the present invention, which is preferably made of a suitable thermoplastic material such as PBT, comprises a transverse section 64 having a front face 66 of substantially rectangular shape, dimensioned to cover or mask substantially completely the from opening of tubular sleeve or member 53 and which may be curved, or preferably, comprise angled flat faces as shown thereby also functioning as a dust cover. Extending rearwardly of transverse section 64 on either side thereof are pivot arms 67 and 68, as shown. The distal end of each of arms 67 and 68 has a bore 69 therein, which is adapted to receive a corresponding pivot pin 63 on the adapter. The spacing between the inner surfaces of arms 67 and 68, which straddle the buildout, is preferably slightly greater than the distance between the exterior side walls of buildout 33 to which pins 63 are affixed, but less than the distance between the distal ends of the pivot pins. Thus, arms 67 and 68 must be spread slightly in order to get the ends thereof over the pins, after which they snap into place with the pins 63 riding in the bores 69. This process is facilitated by imparting a taper to the interior surfaces of arm 67 and 68 adjacent the bores 69, as shown by the dashed lines. The bores 69 have a slightly greater diameter than the pins 63 so that they are what can best be described as loosely pivoted. The reason for this will be more fully understood hereinafter. Located along the lower edge of the face 66 and extending outwardly therefrom is a flange 71 for actuating the shutter 31. It can readily be seen that the bores 69 and pins 63 can be interchanged. Thus, the buildout 33 can have bores on either side, and the distal ends of the arms 67 and 68 can have pins. The spacing between the ends of the pins would be less than the width of buildout 33.

Figure 3A:
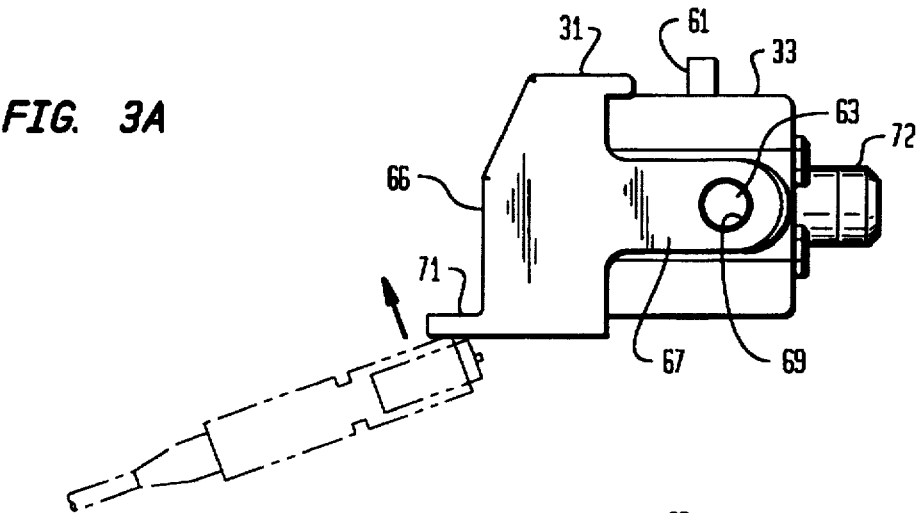
FIG. 3A is a side elevation view of the shutter of the present invention in the closed position as used on a buildout.
Figure 3B:
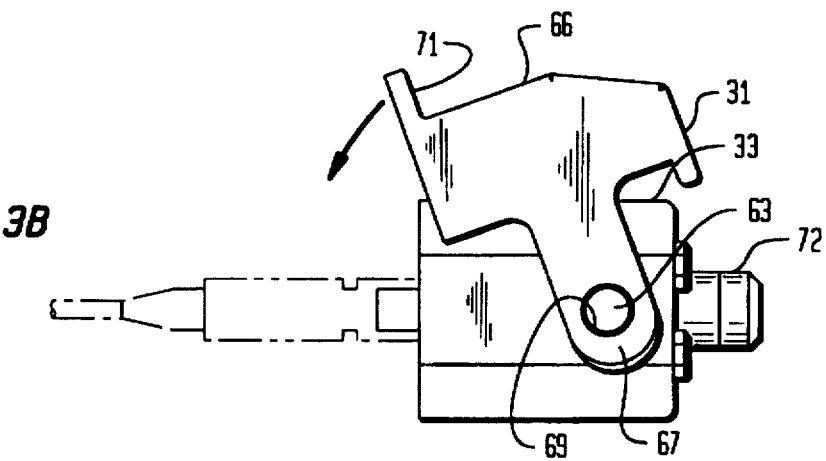
FIG. 3B is a side elevation view of the shutter of the present invention in the open position as used on a buildout.

In FIGS. 3A and 3B there is shown the buildout 33 with the shutter 31 mounted thereon and in the closed position (FIG. 3A) and the open position (FIG. 3B). When the shutter 31 is in its closed position, as shown in FIG. 3A, and as connection is to be made, the operator or installer can raise the shutter by applying the connector, shown in dashed lines, to the underside of flange 71 and applying force in the direction of the arrow. As shutter 31 is raised, a forward movement of the connector functions to insert it into buildout 33, and when shutter 31 is raised sufficiently for clearance, the connector is inserted into the adapter carded by the buildout 33, as portion 72 of which is shown. Thus, the connection is completed by the operator using only one hand, and without exposing him or her to harmful or hazardous optical energy. Inasmuch as bores 69 in arms 67 and 68 are loosely fit over the corresponding pivot pins 63, the shutter 31, as shown in FIG. 3B, will tend to move, under the force of gravity, in the direction of the arrow to where it rests atop the connector. In disconnecting a fiber, the connector is simply pulled straight out and the shutter falls, under the force of gravity, to the position shown in FIG. 3A. Inasmuch as there can be slight variations in dimensions of the parts in the casting or molding process, gravity may not necessarily cause the shutter to close completely. Complete closure can be assured by tapping the top of flange 71 with the connector. In order that the shutter 31 stays closed the spacing between the interior surfaces of the pivot legs may be made substantially equal of the width of buildout 33, especially in the vicinity of the pivot points, or at the very from of shutter 31 so that a degree of friction between shutter 31 and buildout 33 is introduced and tends to resist casual movement between the shutter and the buildout. This friction also functions well where the entire assembly is located on its side instead of vertically, as shown, that is, where it has been rotated approximately 90°. In such a position, gravity cannot be relied upon to cause the shutter to close. However, as explained before, application of the connector to the flange can be used to close the shutter, and friction will hold it in the closed position. The pins 63 are preferably centrally located on each side of the buildout 33 so that the shutter 31 can have the orientation shown, regardless of whether the buildout or adapter is mounted in the patch panel as shown, or is mounted upside down.

Figure 5:
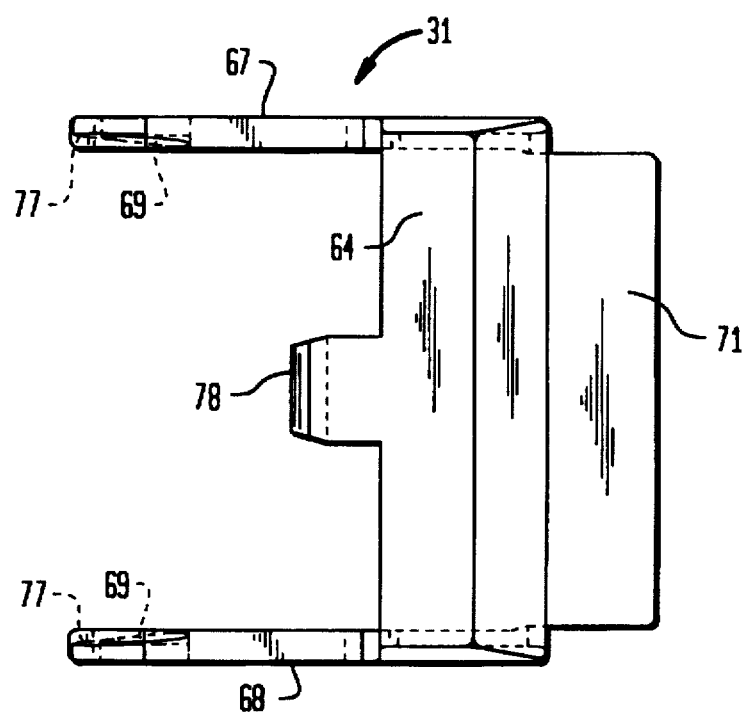
FIG. 5 is a top view of the shutter of FIG. 4.
Figure 4:
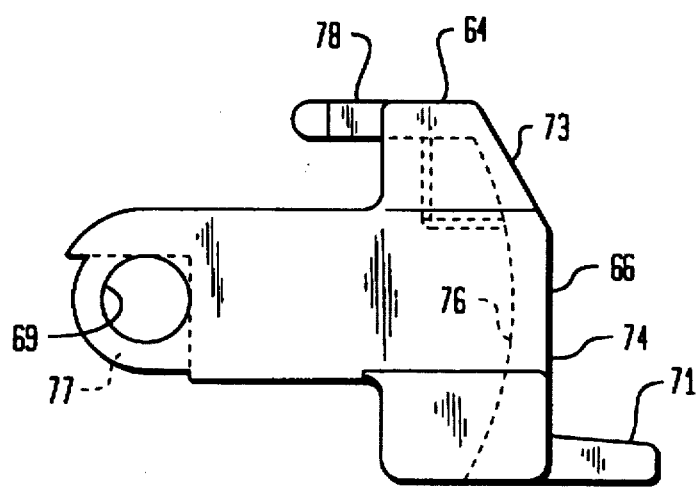
FIG. 4 is a side elevation view of the shutter of the present invention.

FIGS. 4 and 5 are elevation and plan views, respectively, of a preferred configuration of the shutter 31, similar to the configuration shown in FIGS. 3A and 3B. The face 66 of shutter 31 is made up of first 73 and second 74 flat surfaces angularly disposed relative to each other as shown. The interior surface 76 of face 66 is preferably curved, as shown, but it may comprise a flat surface parallel to surfaces 73 and 74, for example, so long as there is sufficient clearance provided for the front face of buildout 33. The configuration of the transverse section 64 including the front and rear surfaces of the face 66 depends in part upon the forming or molding process, and may, as a consequence, vary from that which is shown in FIGS. 4 and 5.

The distal arms 67 and 68 are substantially parallel and are of substantially uniform thickness along their length, the distal ends of each of the pivot arms has a cutaway or tapered portion 77 extending downward and to the rear of the bore 69. This tapered portion 77 facilitates the attaching of the arms 67 and 68 to the pivot pins 63.

The transverse section 64 is provided with a centrally located stop member 78 which extends rearwardly a short distance and functions to limit the travel of the shutter as it is pivoted upward. The only caveat with regard to the length of member 78 is that it should allow the shutter face or transverse portion to clear completely the front opening in buildout 33.

Figure 6A:
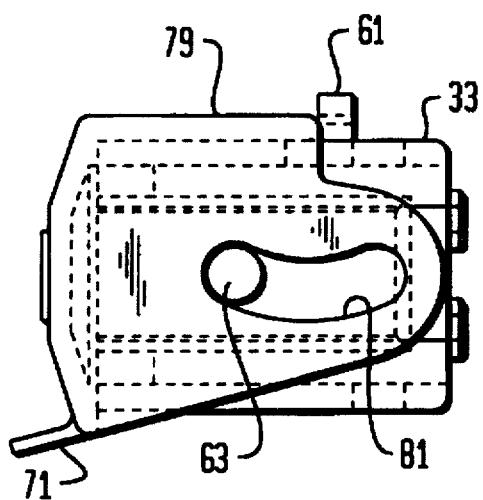
FIG. 6A is a side elevation view of another embodiment of the shutter of the invention in the closed position.
Figure 6B:
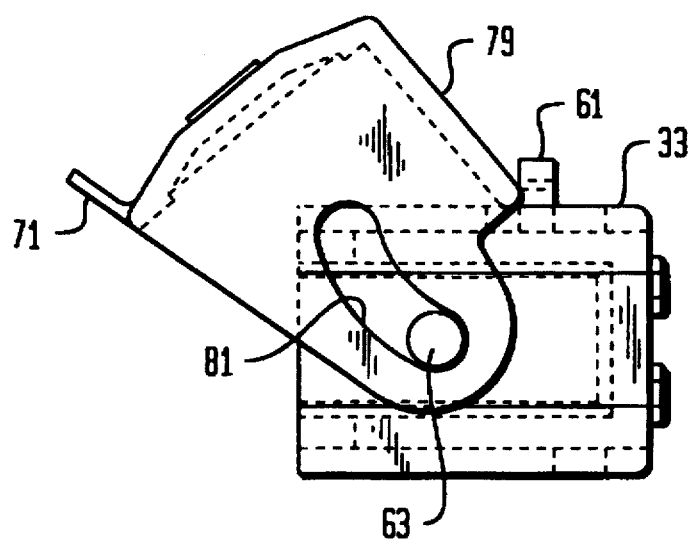
FIG. 6B is a side elevation view of the shutter of FIG. 6A shown in the open position.

FIGS. 6A and 6B depict an alternative configuration 79 of the shutter, in which, as can be seen, instead of the bores 69 in the pivot arms, shutter 79 has arcuate slots 81. The slots 81 have a width greater than the diameter of the pivot pins 63 and allow greater tolerance in the placement of pins 63 on buildout 33, in that they allow for longitudinal movement of the shutter 79 as well as a pivoting movement.

The principles and features of the invention have been illustrated in a preferred embodiment thereof for use with SC connectors and coupling adapters comprising buildout blocks and buildouts. These principles and features, are not limited to such connectors, however, being equally applicable to other connectors and coupling adapters, as will be clearly apparent to workers in the art. Thus, for example, the simple coupling adapter shown in FIG. 1A and 1B can readily be adapted to use with the shutter by the placement of pivot pins on either sidewall, i.e., the top and bottom walls as viewed in FIGS. 1A and 1B.

In conclusion, it should be noted that it will be obvious to those skilled in the art that many variations and modifications may be made to the preferred embodiment without substantial departure from the principles of the present invention, for example, as pointed out in the specification, the bores may be in the buildout and the pins on the pivot arms. All such variations and modifications are intended to be included within the scope of the present invention, as set forth in the claims. Further, in the claims hereafter, the corresponding structures, materials, acts, and equivalents of all means or step plus function elements are intended to include any structure, material, or acts for performing the functions in combination with other claimed elements as specifically claimed.

We claim:

1. An optical shutter for use with one optical coupling adapter having an open end, said optical shutter comprising:
   a light blocking transverse member having first and second sides;
   a first pivot arm extending from said first side in a first direction at an angle to said transverse member, said pivot arm having a free distal end;
   a second pivot arm extending from said second side in said first direction, said second pivot arm having a free distal end;
   said first and second pivot arms being spaced apart a distance greater than the width of the coupling adapter;
   means for pivotally mounting said distal ends of said first and second pivot arms to the sides of the coupling adapter with said pivot arms straddling the coupling adapter; and
   means on said light blocking transverse member for actuating said shutter to block and to unblock the open end of the adapter.

2. An optical shutter as claimed in claim 1 wherein said transverse member has upper and lower sides and said means for actuating said shutter comprises a flange member positioned on said lower side and extending outwardly therefrom.

3. An optical shutter as claimed in claim 1 wherein said means for pivotally mounting said first and second pivot arms comprises a bore in the distal end of each of said pivot arms.

4. An optical shutter as claimed in claim 1 wherein said means for mounting said first and second pivot arms comprises an arcuate slot in each of said arms.

5. An optical shutter as claimed in claim 1 wherein each of said pivot arms has a substantially uniform thickness along its length and a tapered thickness portion adjacent the means for mounting.

6. An optical shutter as claimed in claim 1 wherein said shutter is made of a thermoplastic material.

7. An optical shutter as claimed in claim 6 wherein the thermoplastic material is PBT.

8. The combination of a coupling adapter and an optical shutter wherein said adapter comprises a tubular housing having a substantially rectangular cross-section with first and second side walls having exterior surfaces, said combination comprising:
   a pivot pin extending outwardly from the exterior surface of each of said first and second side walls and having a distal end;
   a shutter member for said open end, said shutter member comprising:
   a transverse member having first and second sides and a transversely extending face;
   a first pivot arm extending from said first side longitudinally in a direction substantially normal to said transversely extending face, said first pivot arm having a distal end;
   a second pivot arm extending from said second side longitudinally and substantially parallel to said first pivot arm, said second pivot arm having a distal end;
   each of said pivot arms having means for pivotally mounting of the distal end of said arm to one of said pivot pins; and
   said arms being spaced apart a distance greater than the distance between said exterior surfaces of said first and second side walls and less than the distance between said distal ends of said pivot pins for straddling said tubular housing.

9. The combination as claimed in claim 8 wherein said means for pivotally mounting said arms comprises a bore adjacent the distal end of each of said pivot arms, each of said bores having a diameter greater than the diameter of the pivot pin on which it is mounted.

10. The combination as claimed in claim 8 wherein said means for pivotally mounted said arms comprises an arcuate slot in each of said arms, each of said slots having a width greater than the diameter of said pivot pin on which it is mounted.

11. The combination as claimed in claim 8 wherein each of said pivot arms is of substantially uniform thickness along its length and has a reduced thickness adjacent said means for pivotally mounted said arm to one of said pivot pins.

12. The combination as claimed in claim 8 wherein said transverse member has third and fourth sides, said third side having a shutter actuating member extending outwardly from said transversely extending face.

13. The combination as claimed in claim 12 wherein said shutter actuating member comprises a flange extending across the width of said third side.

14. The combination as claimed in claim 12 wherein said fourth side has a stop member extending outwardly therefrom.

15. The combination as claimed in claim 8 wherein said tubular housing is made of a relatively hard plastic material such as polysulfone.

16. The combination as claimed in claim 8 wherein said shutter member is made of a thermoplastic material.

17. The combination as claimed in claim 16 wherein said thermoplastic material is PBT.

* * * * *